US007578511B2

(12) United States Patent
Sheehan

(10) Patent No.: US 7,578,511 B2
(45) Date of Patent: Aug. 25, 2009

(54) TRASH BIN HAVING DECORATIVE PANELS AND DETACHABLE CART

(75) Inventor: Deirdre L. Sheehan, Northport, NY (US)

(73) Assignee: Ebabe, Inc., Northport, NY (US)

( * ) Notice: Subject to any disclaimer, the term of this patent is extended or adjusted under 35 U.S.C. 154(b) by 395 days.

(21) Appl. No.: 11/415,378

(22) Filed: May 2, 2006

(65) Prior Publication Data

US 2007/0267831 A1 Nov. 22, 2007

(51) Int. Cl.
*B62B 1/00* (2006.01)

(52) U.S. Cl. ................. 280/79.2; 280/79.11; 280/47.34

(58) Field of Classification Search ............. 280/47.35, 280/47.34, 47.11, 47.371, 79.2, 87.01, 79.11, 280/651, 655, 655.1

See application file for complete search history.

(56) References Cited

U.S. PATENT DOCUMENTS

| | | | | | |
|---|---|---|---|---|---|
| 581,322 | A | * | 4/1897 | Winters | 232/1 R |
| 3,402,848 | A | * | 9/1968 | Busey | 220/495.08 |
| 3,510,055 | A | * | 5/1970 | Safford | 232/43.2 |
| 3,666,169 | A | * | 5/1972 | Eaton | 232/43.2 |
| 3,675,940 | A | * | 7/1972 | Crookston | 280/47.26 |
| 3,756,548 | A | * | 9/1973 | Santarelli et al. | 248/98 |
| 3,831,513 | A | * | 8/1974 | Tashman | 100/52 |
| 3,837,666 | A | * | 9/1974 | Hodson | 280/47.131 |
| 3,845,968 | A | * | 11/1974 | Larson | 280/654 |
| 3,866,936 | A | * | 2/1975 | Hedges | 280/47.26 |
| 3,890,890 | A | * | 6/1975 | Hennells | 100/48 |
| 3,893,615 | A | * | 7/1975 | Johnson | 232/43.2 |
| 3,907,117 | A | * | 9/1975 | Williams | 211/85.19 |
| 3,920,259 | A | * | 11/1975 | Graham | 280/47.34 |
| 3,933,366 | A | * | 1/1976 | Wilburn | 280/47.31 |
| 3,934,894 | A | * | 1/1976 | Hoeffken et al. | 280/47.19 |
| 4,073,228 | A | * | 2/1978 | Henzl | 100/52 |
| 4,670,227 | A | * | 6/1987 | Smith | 422/297 |
| 4,832,222 | A | * | 5/1989 | Storton | 220/6 |
| D303,306 | S | * | 9/1989 | Briscoe | D34/5 |
| 4,892,218 | A | * | 1/1990 | Reiling | 220/263 |
| 4,923,080 | A | * | 5/1990 | Lounsbury | 220/600 |
| 5,015,142 | A | * | 5/1991 | Carson | 414/408 |
| 5,044,644 | A | * | 9/1991 | Duran et al. | 280/47.35 |
| D324,282 | S | * | 2/1992 | Schnitzer et al. | D34/5 |
| D327,152 | S | * | 6/1992 | Rose et al. | D34/5 |
| 5,131,552 | A | * | 7/1992 | Falso | 220/23.4 |
| D329,516 | S | * | 9/1992 | Bailly | D34/5 |
| D335,012 | S | * | 4/1993 | Broussard | D34/7 |
| 5,361,978 | A | * | 11/1994 | Monroe | 232/43.1 |

(Continued)

*Primary Examiner*—Christopher P Ellis
*Assistant Examiner*—Vaughn T Coolman
(74) *Attorney, Agent, or Firm*—Leo G. Lenna, Esq.

(57) ABSTRACT

The present invention is directed to a trash bin, namely an enclosed trash bin having a top and front doors that swing open on a hinged system. The enclosed trash bin contains a detachable cart in which trash and/or trash cans can be placed upon for storage and the cart can be detached from the rest of the trash bin and wheeled to the curb on trash pick-up day. The wheeled cart can either be removed from the inside of the trash bin or makes up at least one portion of the trash bin so that when it is removed it is brought to the curb with at least one portion of the cart. When the cart is returned to the trash bin and placed inside of the bin the trash bin is then whole and impermeable to raccoons and other animals and/or rodents.

15 Claims, 5 Drawing Sheets

U.S. PATENT DOCUMENTS 6,138,558 A * 10/2000 Harrington .................. 100/102
6,202,922 B1 * 3/2001 Phillips et al. ............. 232/43.1
6,637,764 B2 * 10/2003 Novakowski ............... 280/504
2006/0043090 A1 * 3/2006 Ferrini .......................... 220/6

* cited by examiner

TRASH BIN HAVING DECORATIVE PANELS AND DETACHABLE CART

FIELD OF THE INVENTION

The present invention relates to a trash storage device and more particularly to a trash bin that stores daily trash and makes the transportation of the trash to the curb on pick-up day easier with a wheeled system. The trash bin is designed to protect the trash from animals, allow for ventilation, and to be decorative so as not to be an eyesore next the building in which it is stored. The trash bin can also be customized with decorative panels so as to match or complement the building next to which it is installed.

BACKGROUND OF THE INVENTION

Everyday life includes many chores that need to be done on a recurring basis. Home and business owner's daily storage and the task of taking out the garbage can be particularly challenging. In most areas, homeowners need to take the trash cans to the curb for pickup by the municipal or private garbage collectors at least once and most often several times a week. This can mean carrying, or rolling several individual trash cans to the front curb, which can be anywhere from ten feet away from the house to several hundred feet away from the house.

For many homeowners this task is done early in the morning, rather than the night before pickup because animals, such as raccoons, fox, deer and the like often get into the trash cans and throw trash all over the lawn while looking for food. Currently, one of the only alternatives currently available to prevent waking up to a lawn full of trash is to take the trashcans to the curb the morning of pickup. Often, taking the trashcans to the curb the morning of pickup usually means it is done when the homeowner is dressed and rushing to work.

Individual trashcans with wheels are easier to get to the curb than non-wheeled trashcans since they do not have to be carried. However, the wheeled trash cans do very little to protect the cans from being toppled and opened by animals if left outside overnight. Some trash cans use the handles from which they are pulled to lock the cover of the trash can closed. Although a good concept, the handles are usually easily opened by determined rodents looking for their next meal and therefore are of little help.

Another problem associated with using individual trash cans is the fact that the homeowner can transport only one wheeled trash can at a time to the curb. Therefore, it is often necessary for the homeowner to make several trips to complete the task. Making several trips can be time consuming and depending on the distance and incline from the house to the curb can be exhausting. This fact alone makes the option of using individual trashcans less attractive than the trash cart of the present invention.

Between the assigned days for garbage pick up is the ongoing problem of daily garbage storage. Many people store garbage in their garage until pick up day. This often causes a space issue with cars and/or other items being stored as well as odors permeating the structure. Others opt to keep their garage outside using a multiple of solutions in order to ward off animals. This includes ropes and bungee cords attempting to secure the garbage and/or adding weighted objects to the top of the trash cans. Each time a homeowner adds trash, they must re-secure the trash can covers.

There are devices available today that are used to transport trash cans to the curb for pick up but these devices are not enclosed, leaving the trash cans/garbage exposed to animals.

Since the trash cans are not protected against animals, these devices must be stored inside and therefore are only marginally better than individual wheeled trash cans and do not solve the problem of garage space.

Another problem faced by homeowners with trashcan transportation devices and trashcans available on the market today is that they are often unattractive. In stark contrast, the trash bin/cart of the present invention has decorative panels that can be used to either match or complement the building next to which it is stored.

Finally many of the transportation carts available on the market today are made of flimsy tube piping making the overall structure un-sturdy. Therefore in view of the foregoing shortcomings, what is needed is a trash bin that is sturdy enough to allow a homeowner to store their daily garbage, move the garbage to the curb easily, and store the garbage between pickup days without worrying about the animals getting into the trash. Additionally, the trash bin/cart system is decorative so as to complement a building when stored on the side of the house or left at the curb for pickup. The present invention contains all of these attributes and more and solves the problems and shortcomings described above.

SUMMARY OF THE INVENTION

The present invention is directed to a trash bin and cart system comprising a trash bin having a front panel, a back panel, a left side panel, a right side panel, a top panel, and a bottom panel in communication to form an enclosure. The trash bin also contains at least one hinge that attaches the top panel of the trash bin to the back panel of the bin so that the top panel moves freely away from the back panel to reveal an interior portion of the trash bin. The trash bin system also includes a trash cart configured so as to fit within the trash bin. The trash cart comprises a wheel base having at least one axle connected to the trash cart wherein the axle has at least one wheel arranged so that the trash cart is able to move freely about. In alternative embodiments the trash cart can have two, three, four or more wheels arranged so as to distribute the weight of the trash cans and to optimize the maneuverability of the cart.

The structure may also have a front panel having at least one hinge means that is configured so as to be in direct communication with at least one door, the door being contiguous with the front panel of the trash bin and the when closed and exposes an interior portion of the trash bin when opened. The opening created by opening the door being large enough for the trash cart to exit and re-enter for storage into the trash bin. In an alternative embodiment of the trash bin, the trash bin is configured to have two doors on a hinge means that open in opposite directions to expose the interior of the trash bin. The trash bin system can be equipped with a ramp so as to allow for easy exit and re-entry of the trash cart.

Another embodiment of the invention is directed to a trash bin and cart system kit comprising a front panel, a back panel, a left side panel and a right side panel, a top panel, and a bottom panel. At least one hinge means for attaching the back panel and the top panel and at least one hinge means for attaching at least one door to the front panel so that when one or more of the doors are opened an interior portion large enough for a cart to pass through is exposed.

In other words, the trash cart in the kit is configured so as to fit within the trash bin and comprises a wheel base having at least one axle connected to the trash cart. The axle connected to the wheel base has at least one wheel, but may have two, three, four or more wheels attached. The wheel(s) arranged so that the trash cart is able to freely move about on the wheel base.

The kit is also equipped with materials to customize the trash bin. For example the kit may be equipped with attachable decorative panels that are configured so as to be attachable to the front panel, the back panel, the left side panel, the right side panel, and the top panel of the trash bin. Since the trash bin is designed to be stationary the trash bin can be customized to blend and/or match the structure next to which is stored.

The kit also include fasteners to connect the front panel, the back panel, the left side panel, the right side panel, and the top panel of the trash bin together and the decorative panels to the front panel, the back panel, the left side panel, the right side panel, and the top panel. The kit is easier to ship than a version that is already assembled In still another embodiment the trash bin the trash cart is configured to have at least one wheeled axle located at the back portion of the bottom panel of the trash cart and at least one leg of the same height as the wheel is attached to the front portion of the bottom panel of the trash cart so that the trash cart is leveled. The wheeled axle makes transporting of trash cans in the trash cart easier for the user. In an alternative embodiment of the invention, a second wheeled axle is attached to the front bottom panel of the trash cart replacing the leg previously mentioned. The four-wheeled trash cart is designed to handle more weight than the single axel version.

Both the single and multiple axel version of the present invention may be equipped with a steering mechanism that will allow the user to maneuver the trash cart to the curb on pick-up day and back to the storage place once the trash is collected.

On the outside portion of the front panel, the back panel, the left side panel, the right side panel, and the top panel is an attaching means for attaching decorative panels. The kit can have several different decorative panels that can make the enclosure complement the building in which it belongs or an ornate structure such as plastic overlay design (such as basket weave) wrought iron design, stucco, wood frame, vinyl shingles, aluminum siding or the like to give it a unique look.

The top panel can be hinged to the back panel so that it can open to reveal the trashcans stored inside. In one embodiment of the trash cart the top panel of the trash cart can be split in more than one portion, preferable two portions. Each of the aforementioned portions is configured so that they can be hinged to the back panel so as to open together or independently. The front panel can be designed so as to have a single or double doors hinged so that the door(s) can be opened to reveal the trash cans stored with the enclosure.

The kit may also contain illustrative instructions that describe how the described components fit together. These embodiments as well as others are further described in the drawings and the Detailed Description of the drawings immediately following this section.

Figure 1:
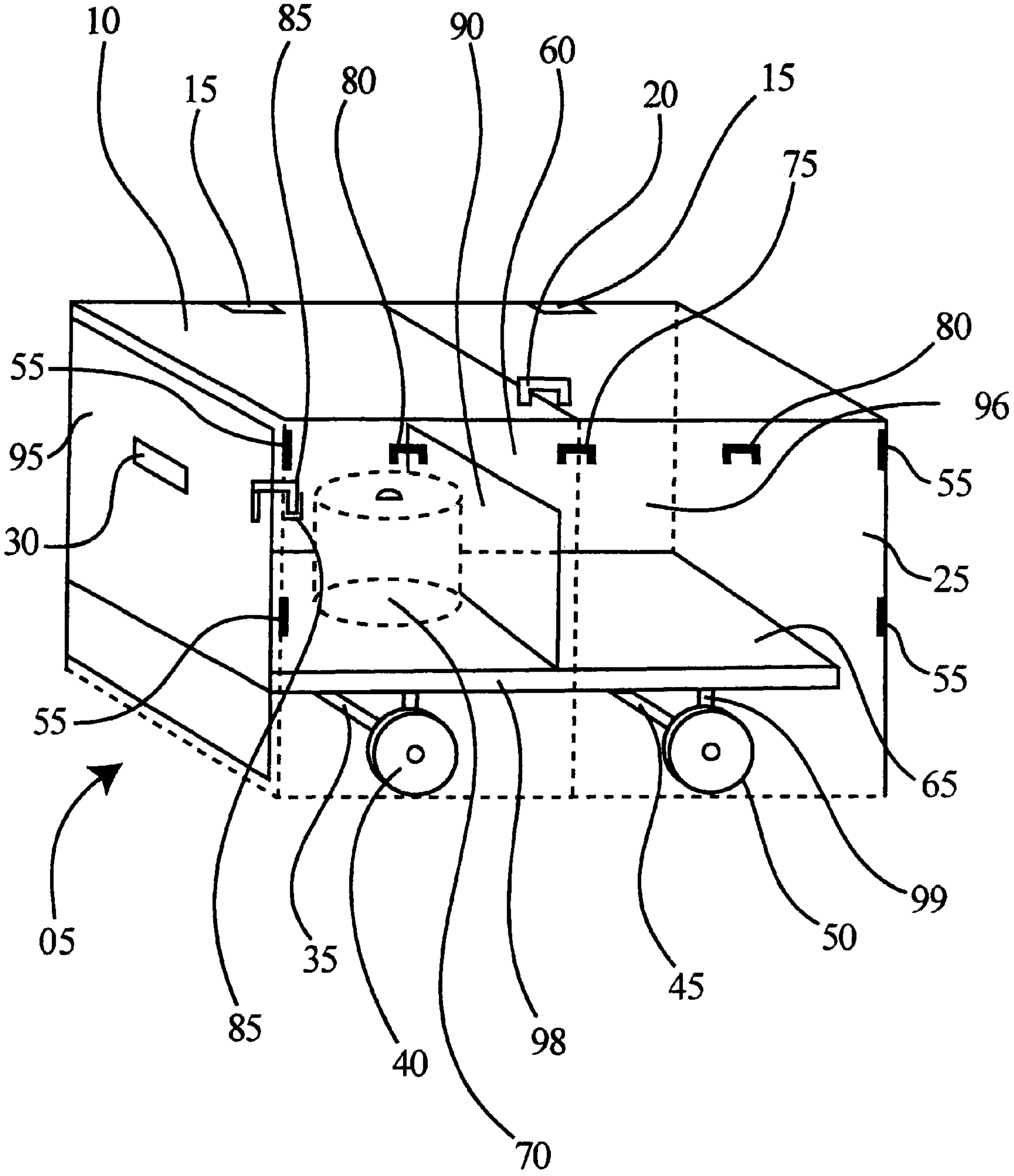
FIG. 1.

(05) a full view of the trash bin and trash cart inside cart with doors and top lids closed.

(10) top panel (15) top hinges (20) top handle (25) right side panel (30) steering means (35) front axle (40) front wheel (45) rear axle (50) rear wheel (55) front door hinges (60) left front door (65) right front door (70) trash can (75) front door latch (80) front door handle (85) side latch (90) separator panel (95) left side panel

FIG. 2:

(100) a full view of the trash cart (105) side panel (110) handle (115) latch spring (120) latch (125) separator (130) flatbed of cart (135) rear axle (140) front axle (145) front wheel (150) hooks for carrying bulky material (155) rear wheel

FIG. 3:

(200) full view of alternative embodiment of the trash cart (205) steering means (210) front axle (215) side lip (220) front wheel (225) rear axle (230) rear wheel (235) flatbed (240) handle (245) separator panel (250) front lip (255) back lip

FIG. 4:

(300) enclosed alternative trash cart in trash bin (305) side panel door (310) hinges (315) pull handle (320) latch spring (325) latch (male)

(330) latch (female)

(335) front door lock (340) ramp (345) top panel (350) top panel handle (355) front handle (360) front axle (365) front wheel (370) rear axle (375) rear wheel (380) flat bed (385) front door

FIG. 5

(400) a schematic of the kit assembly.

(405) top panel (410) top panel hinges (415) separator panel (420) front panel handle (425) back panel (430) right side panel (435) left side panel (440) bottom panel (445) separator panel
(450) wheel
(455) axle
(460) steering means
(465) structural supports
(470) left front door
(475) right front door
(480) steering connection
(485) instructions
(490) fasteners and bolts
(495) flat bed

DETAILED DESCRIPTION OF THE INVENTION

The present invention is directed to a trash bin and cart system designed to be functional but yet decorative. The cart of the cart portion of the present invention is designed to make the chore of "taking out the trash out" easy without compromising the appearance outside of the house. In other words, the trash cart of the present invention can be filled with trash bins and stored within the trash bin until the day for garbage pickup. In the trash bin, the trash cans are protected from the weather and the animals without unsightly trash cans being stored on the side of the house or in the garage.

The trash bin and cart system is designed to provide a decorative and easy way to store trash outside the house while preventing egress into the trashcans by animals. These and other features are shown in FIGS. 1-5 of the present document and are further described below.

FIG. 1 shows a cut-away schematic view of the trash bin and trash cart system with the doors and the top of the trash bin closed (05). The trash bin is transparent to show the details of the inside of the trash bin. The trash bin comprises a top panel (10), a back panel (96), a right side panel (25), and a left side panel (95) that is configured to make a shelter. The top panel (10) is removably attached to the back panel (96) by hinges (15) and is capable of being lifted away from the rest of the trash bin to reveal the inside of the trash cart.

The trash bin also has a left front door (60) and a right front door (65) that is connected to at least a portion of the side frames of the trash bin by front door hinges (55). The front door hinges (55) allows the front door panels (60, 65) to swing open and reveal the inside of the trash bin (05). The left side panel (95) can be attached to the back panel (96) so that the left side panel (95) can swing open to reveal the inside of the trash bin. Attached to the left side panel (95) is a side latch system (85) which has a latch positioned on the side panel and an insert that the latch fits in on either the frame and/or the front panel that secures the side panel closed. Similarly, the front panel doors can be secured close with a front door latch (75) and the top panels may be secured closed using a latch system. All latches should be child and animal proof so as to keep the trash bin secured when closed.

Inside the trash bin (05) is a trash cart (98) that comprises a steering means (30) in communication with at least one of the front or rear axles (35, 45). The steering means (25) can be as simple as a handle attached to the side panel or a pull stick or as complex as steering means with a braking system. The cart also comprises front wheels (40) and rear wheels (50) attached to the front and rear axles (35, 45) and to wheel supports (99). The wheel supports (99) attach to either the wheels directly or to the axle in order to support the weight placed on the platform of the cart (98). The cart (98) is designed to freely move about once it is removed from the trash bin.

The trash cart (99) may also be equipped with a separator panel that separates and prevents the trash cans (70) from moving about on the cart (98). In addition, the panels that may be opened may be equipped with handles to do so. The trash bin (05) may be equipped with a floor panel or may use the pavement in which it is placed as the floor of the trash bin. If the trash bin is not equipped with a floor and is placed on grass, a solid medium must be placed down so as to prevent animals from getting into the trash bin.

The cart of the trash cart system is designed to fit within the trash bin and to store trash cans that are filled throughout the week. On pickup day, the side panel can be unlatched and opened to allow the trash cart to be wheeled out of the trash bin and to the curb. Once the trash has been picked up, the trash cans be placed on the cart again and stored back into the trash bin.

Figure 2:
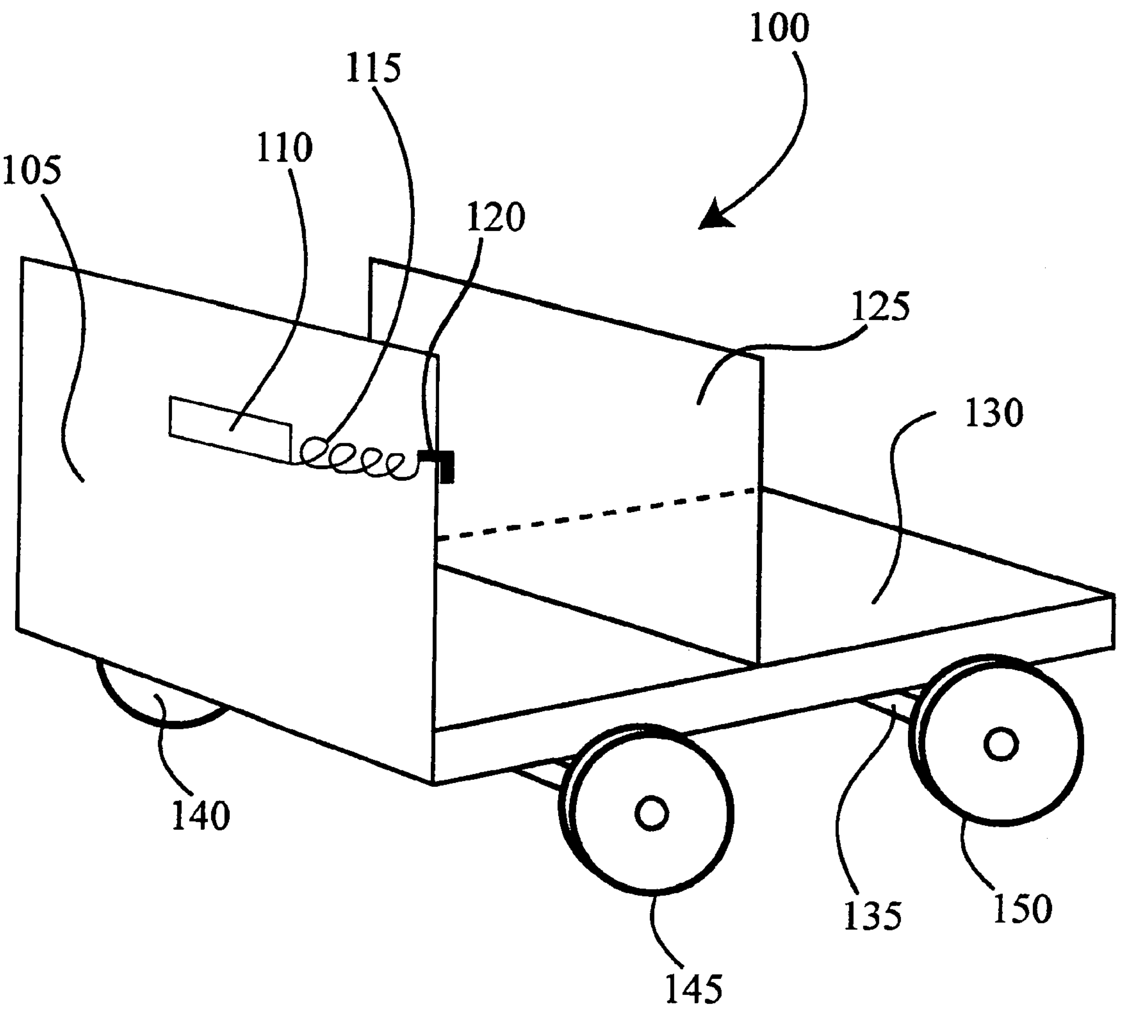

FIG. 2 shows a trash cart (100) having a side panel (105), a handle (110), and a latch/latch spring assembly. The cart is designed to fit into the remaining structure of the trash bin and to latch close once in place using the latch assembly. The latch assembly comprises and latch (120) attached to a latch spring (115) which is attached to a handle (110). Once the handle (110) is contracted the latch spring (115) is shifted and the latch (120) moves in a direction that allows it to disengage from the rest of the trash bin. Being unlatched the trash cart can be rolled away from the rest of the trash bin. When the cart is placed back in the trash bin, the handle (100) can be contracted and the latch (120) attached to the rest of the trash bin to lock it in place.

The cart is equipped with a front axle (140) and a rear axle (135). The front and rear axles (135, 140) have front and rear wheels (145, 155) associated attached to the axles. The axles are attached to the underside of the flatbed of the cart (130). The flat bed of the cart can have a separator (125) attached to prevent the trash cans from shifting around.

Figure 3:
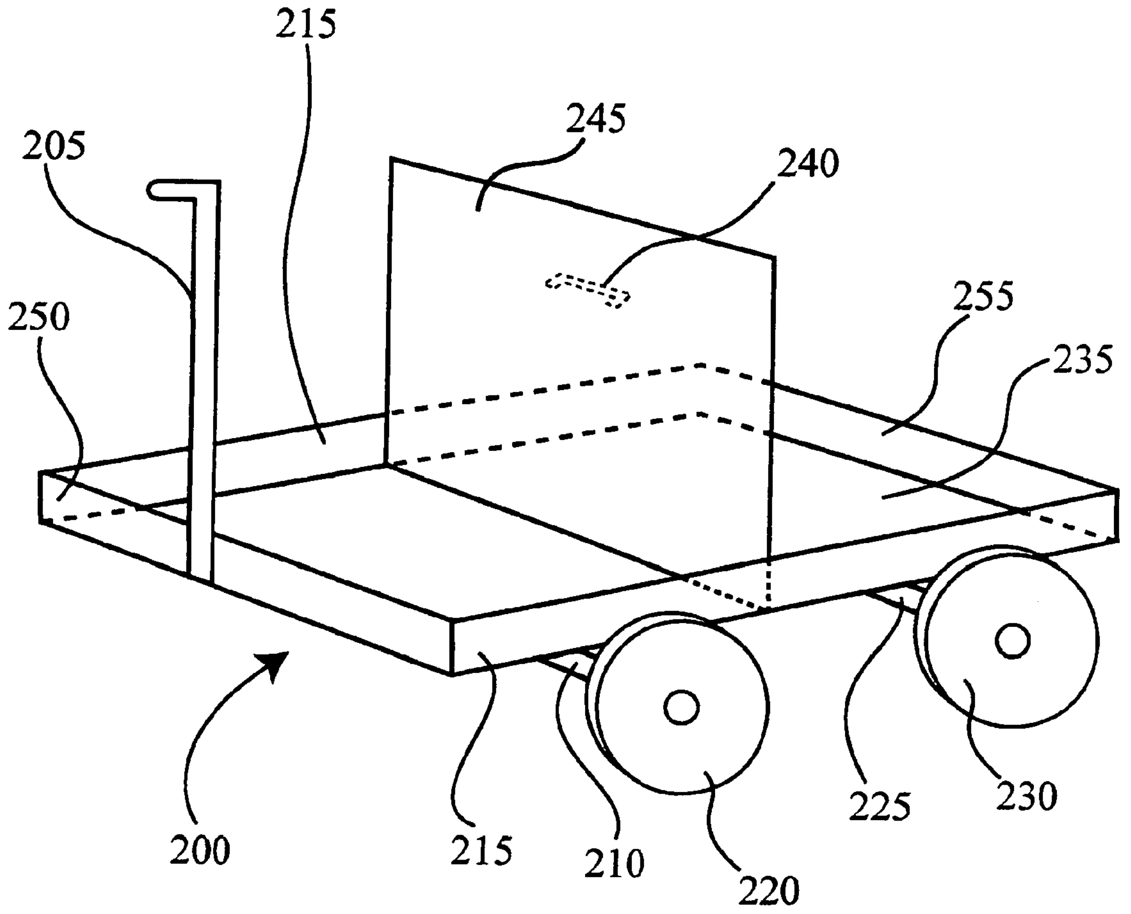

Alternative embodiments of the trash cart are envisioned to be full within the scope of the present invention. For example, FIG. 3 shows one of such alternative embodiments. In this embodiment, the cart fits within the trash bin and does not contain part of the overall trash bin. This embodiment is used in conjunction with a trash bin as shown in FIG. 1. In other words, this embodiment is directed to a trash bin that has all sides attached, with at least one side attached to the frame by hinges so that it can be opened to remove the cart. In This embodiment, the trash cart (200) is like a dolly in that it has a flatbed (235) with a separator panel (245) and a front lip (250), a back lip (255) and side lips (215) to keep the trash cans from falling off of the cart when being transported to the curb. Once at the curb the dolly can be parked there with the trash cans or the trash cans can be taken off and placed by the curb while the trash cart is placed back into the trash bin.

As with the other carts described above, the trash dolly can have a steering mechanism 205 that is used to maneuver the dolly to the curb. The dolly is equipped with front and rear axles, or in the alternative can have only a single axle towards the rear of the dolly and the front can be lift off of a rest and carried to the curb. The separator can be equipped with handle (240) that can be used to pull the dolly sideways allowing the dolly to be taken out of the front doors of the bin when opened.

Figure 4:
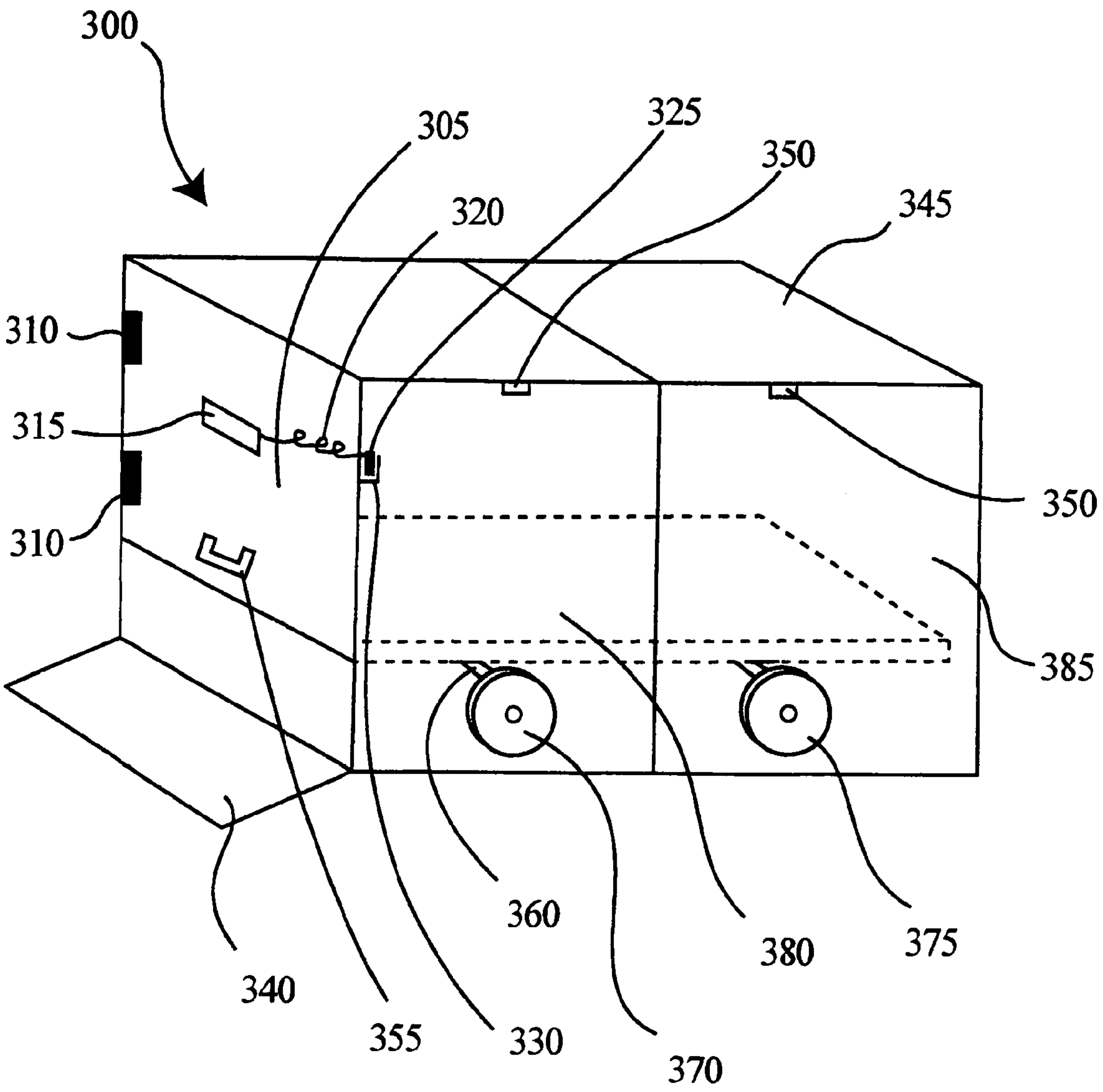

This type of dolly can is used with the trash bin shown in FIG. 4. The alternative embodiment of the trash cart and bin (300) comprises many of the same features in the embodiment shown in FIG. 1 except the side panel is not part of the dolly but is attached to the rest of the trash bin via hinges (310). In this embodiment, the side panel can be opened and the cart pulled down the optional ramp (340) out of the trash bin.

Still another embodiment of the invention is directed to a trash cart kit comprising a top panel (405), top panel hinges (410), separator panel (415), front panel handle (420), back panel (425), right side panel (430), left side panel (435), bottom panel (440), separator panel (445), wheels (450), axles (455), steering means (460), structural supports (465), left front door panel (470) right front door panel (485), steering connection (480), instructions to assemble the trash cart (485), and various fasteners, bolts and pins necessary to connect all of the parts together. The trash cart kit is shown in FIG. 4 and is designed to be easily assembled. The trash cart kit is easier to ship, store, and package, all of which results in savings that can be passed on to the consumer. In addition, compact packaging also allows the consumer to transport the trash cart from the store to home without a truck.

The trash cart, once assembled, has all of the features, attributes and benefits of the fully assembled versions shown in FIGS. 1-3. The trash cart kit can also includes special fasteners that allow the owner to decorate the trash cart so as to be pleasing to the eye, match the structure in which is stored next to or to just to personalize the cart. For example, the kit can include special fasteners and a printable plate that can be engraved and/or printed with the name and/or address of the owner.

In still another embodiment of the invention, the panels can be almost completely solid having only a few holes for water drainage and/or ventilation. The fasteners can be attached to the top panels (405), back panel (425), right side panel (430), left side panel (435), bottom panel, left front door panel (470) and right front door panels allowing for decorative panels to be attached to the trash cart. The decorative panels can be made out of material selected from the group consisting essentially of wood, wrought iron, aluminum, stainless steel, powder coated aluminum, plastic, polyvinyl chloride, powder coated steel, plastic coated metal, man-made materials, new-age materials, or any other material that is washable, strong enough and durable enough for trash cart wear. Custom panels can be made so as to match any structure or to make any trash cart unique.

Another feature that can be added to the trash cart is an internal light that turns on automatically using a light sensor when either the top panel or front doors are opened. This light can be powered by solar or energy from a battery. The same solar charge/battery pack can be used to power an odor control unit that emits a scent to mask the smell of the trash either on a timer or using a malodorous detector that activates the fragrance emitter when odors reach a certain detectable level. The floor of the trash cart may also contain a trash can holding means designed so as to fit the bottom portion of the trash can and prevent it from shifting during transportation to the curb for pick-up. All of these features are known in the art but are unique when incorporated into the present invention.

Figure 5:
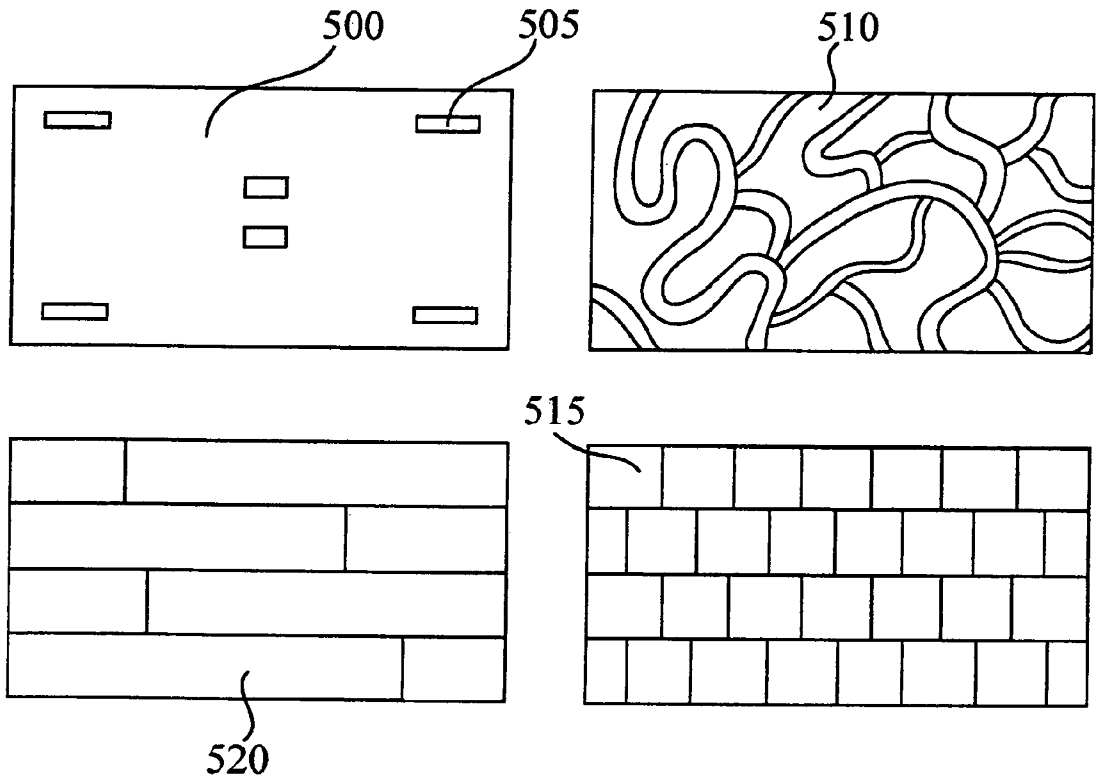

FIG. 5 gives several examples of decorative panels. These are only examples and many other designs can be used and are anticipated to fall with the scope of the invention. These panels should be weather resistant; however, making the trash cart from a virtually indestructible material will allow the cart to last while changing the decorative panels on the outside would allow the trash cart to look new even though the internal structure is old. This is a direct savings to the consumer and opens up an additional market for decorative panels.

The above embodiments of the present invention can be manufactured using well-established manufacturing techniques used in similar industries today. The technique used to make the present invention is directly related to the material used to make the trash cart. For example, if plastic is used to make the trash cart then the well-established technique of cast molding maybe used. If metals are used to make the trash cart, then welding and/or drop forging of metals maybe used to make the trash cart. And finally, if wood is used to make the present invention then standard wood milling and carpentry techniques can be used. The aforementioned list is not meant to be an exhaustive list designed to cover all of the possible techniques that can be used to make the invention but are only offered as examples. One skilled in the art would manufacture the trash cart using techniques available at the time the trash cart is manufactured.

The materials used to make the present invention should be durable enough to withstand the abuse often associated with trash cans but must be light enough so that the trash cart can be moved easily and without undue effort just to carry the weight of the trash cart.

In another embodiment of the invention, the trash cart is equipped with a motor that is in direct communication with at least one wheel and/or axle of the trash cart that when powered would rotate the wheel and/or axle so as to move the trash cart in the forward or reverse direction. The motor can be powered by gas, electric or some combination of each and can be controlled by either a remote control device or a direct control device.

The trash bin as well as the trash cart can contain at least one wheel so that the trash bin can be moved either with the wheeled trash cart inside the trash bin or not. This will give the option to the user to either move the entire trash bin or to leave the trash bin in place and only move the trash cart. Having wheels on the trash bin also makes it easy to move in order to clean behind and under. This addition can also be incorporated into the kit described herein.

So as not to allow egress of small animals into the main compartment of the trash cart, the panels should have predominately solid construction having only strategic holes for ventilation and water removal. The enclosure should also be designed to keep most of the rain water from getting into the structure. To achieve this task the structure is designed to have a slanted roof so as allow rain to run off of the top panel and avoid pooling of excess water. Although the main compartment of the trash cart is predominately solid construction the homeowner is able to achieve a more airy look using the decorative overlay panels. In other words, the overlay panels, once attached, would allow the home owner to achieve the wrought iron look that by definition has large spaces between each segment—spaces too large to be able to keep animals from getting into the trash cart—while still protecting the trash from animals.

As with most things in life, the trash cart of the present invention would be able to marketed as a standard model containing the basic structure to the deluxe model comprising the basic model plus the add-on features such as decorative overlay panels, outside lighting, odor diffuser, motor with remote control as well as other added features that complement the basic features of the invention. The trash cart can be designed to fit one or more trash cans, preferably two trash cans.

In summary, the present invention is directed to a trash cart that is mobile, easy to get trash cans in and out of, protects the trash cans from animal destruction, is durable, decorative and allows the user to store and transport the trash cans to the curb for collection quickly and without getting soiled.

While the invention has been illustrated and described with respect to specific illustrative embodiments and modes of practice, it will be apparent to those skilled in the art that various modifications and improvements may be made without departing from the scope and spirit of the invention.

Accordingly, the invention is not to be limited by the illustrative embodiment and modes of practice.

What is claimed is:

1. A trash bin and cart system comprising:

a trash bin comprising a front panel, a back panel, a left side panel, a right side panel, a top panel, and a bottom panel in communication to form an enclosure wherein each of said front panel, said back panel, said left side panel, said right side panel, and said top panel is configured to have a sleeve so that at least one decorative panel can be slide into said sleeve so as to display said at least one decorative panel;

at least one hinge attaching said top panel to said back panel so that said top panel moves freely away from said back panel to reveal an interior portion of said trash cart, a plurality of decorative panels configured so as to be attachable to said front panel, said back panel, said left side panel, said right side panel, and said top panel of said trash cart; and a trash cart configured so as to fit within said trash bin comprising a wheel base having at least one axle connected to said trash cart, said axle having at least one wheel arranged so that said trash cart moves freely on said wheel base.

2. The trash bin and cart system according to claim 1 wherein at least one of said side panels of said trash bin is attached to said wheeled cart and is wheeled away from the rest of said trash bin when said trash cart is wheeled from said trash bin exposing the interior of said trash bin.

3. The trash bin and cart system according to claim 2 further comprising at least one locking system that locks said trash cart containing at least one side panel of said trash bin to the remaining portions of said trash bin so as to prevent animal intrusion.

4. The trash bin and cart system according to claim 3 wherein the locking system comprises a pin and islet system wherein said islet is attached to at least one portion of said trash bin and said pin is attached to said trash cart, said pin and islet system configured so that said pin removably fits within said islet.

5. The trash bin and cart system according to claim 4 further comprising a handle and spring configuration having a locked and unlocked position, said handle being attached to said pin and islet system wherein when said handle is in said locked position said pin is inserted into said islet and when said handle is in said unlocked position said pin is not in said islet and said trash cart can be removed from said trash bin.

6. The trash bin and cart system according to claim 1 further comprising a door cut from said front panel of said trash bin, said door being attached to a remaining portion of said front panel by at least one hinge whereby said door moves freely away from said remaining portion of said front panel to reveal an interior portion of said trash bin.

7. The trash bin and cart system according to claim 6 wherein at least one additional door is cut from and attached to a remaining portion of one of the structures selected from the group consisting of said left side panel, said right side panel, said bottom panel, and said top panel by at least one hinge whereby said at least one door moves freely away from the structure it is attached so as to reveal an interior portion of said trash bin.

8. The trash bin and cart system according to claim 6 wherein said trash bin comprises a first door attached to said right side panel by at least one hinge so that said door moves freely away from said right side panel to reveal an interior portion of said trash bin and a second door attached to said left side panel by at least one hinge so that said door moves freely away from said left side panel to reveal an interior portion of said trash bin.

9. The trash bin and cart system according to claim 1 wherein the trash cart further comprises a steering means for steering said trash cart, said steering means in communication with said wheels so that turning said steering means turns said wheel base.

10. The trash bin and cart system according to claim 9 wherein said wheel base comprises two multi-wheel and axle configurations, each multi-wheel and axle configuration having at least one wheel attached at opposite ends of each axle.

11. The trash cart according to claim 1 wherein said at least one decorative panel are constructed out of material selected from the group consisting of wrought iron, stucco, wood frame, shingles, aluminum siding, polyvinylchloride (PVC), imitation brick, imitation cedar shingles, and vinyl siding.

12. The trash cart according to claim 1 wherein said at least one decorative panel further comprise an attachment means to attach to said at least one decorative panels to said front panel, said back panel, said left side panel, said right side panel, and said top panel of said trash cart.

13. The trash bin and cart system according to claim 1 further comprising at least one separator panel attached to the wheeled cart portion of said trash cart whereby dividing the interior portion of said trash cart into multiple compartments.

14. The trash bin and cart system according to claim 1 wherein said bottom portion of said trash bin and cart system further comprises a guide track, said guide track configured so as to guide said wheels of said cart into said trash bin.

15. The trash bin and cart system according to claim 1 further comprising a ramp system in communication with said bottom of said trash bin so as to provide easy egress into and out of said trash bin with said cart.

* * * * *